(12) United States Patent
Yanaka et al.

(10) Patent No.: US 7,822,516 B2
(45) Date of Patent: Oct. 26, 2010

(54) AUTOMOTIVE VEHICLE WITH REDUNDANT CONTROLLER

(75) Inventors: Akihiro Yanaka, Toyota (JP); Masayoshi Hoshino, Toyota (JP); Hirotada Otake, Susono (JP); Tomokiyo Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1323 days.

(21) Appl. No.: 10/853,507

(22) Filed: May 26, 2004

(65) Prior Publication Data

US 2004/0243287 A1 Dec. 2, 2004

(30) Foreign Application Priority Data

Jun. 2, 2003 (JP) ............................. 2003-156764

(51) Int. Cl.
*G01M 17/06* (2006.01)
(52) U.S. Cl. ............................. 701/29; 701/43; 340/438
(58) Field of Classification Search .............. 701/29–30
See application file for complete search history.

(56) References Cited

U.S. PATENT DOCUMENTS

| 5,235,951 | A | * | 8/1993 | Taguchi et al. | 123/397 |
| 5,339,782 | A | * | 8/1994 | Golzer et al. | 123/399 |
| 6,109,239 | A | * | 8/2000 | Watanabe | 123/396 |
| 6,318,819 | B1 | * | 11/2001 | Bohm et al. | 303/122 |
| 6,480,780 | B1 | * | 11/2002 | Schwamm | 701/100 |
| 6,859,708 | B2 | * | 2/2005 | Hashimoto et al. | 701/48 |
| 2002/0091475 | A1 | * | 7/2002 | Hashimoto et al. | 701/48 |
| 2004/0243287 | A1 | * | 12/2004 | Yanaka et al. | 701/29 |
| 2006/0113138 | A1 | * | 6/2006 | Maron | 180/271 |

FOREIGN PATENT DOCUMENTS

| DE | 43 02 925 | | 2/1993 |
| DE | 4302295 | A1 * | 8/1994 |
| DE | 197 35 017 | | 8/1997 |
| DE | 198 32 950 | | 7/1998 |
| JP | 4-304589 | | 10/1992 |
| JP | 5-12597 | | 5/1993 |
| JP | 5-202793 | | 8/1993 |
| JP | 6-15333 | | 3/1994 |
| JP | 9-151780 | | 6/1997 |

(Continued)

OTHER PUBLICATIONS

German Office Action dated Nov. 7, 2006.

(Continued)

*Primary Examiner*—Thomas G Black
*Assistant Examiner*—Shelley Chen
(74) *Attorney, Agent, or Firm*—Finnegan, Henderson, Farabow, Garrett & Dunner, LLP

(57) ABSTRACT

An automotive vehicle having a pre-selected function, and including a controller which controls an object and includes a plurality of redundant elements which are redundant with each other, and a function restraining portion which partially or fully restrains the function of the vehicle, when a pre-selected failure which has occurred to one of the redundant elements has not solved before another of the redundant elements has operated for more than a pre-set time since the occurrence of the failure.

15 Claims, 6 Drawing Sheets

FOREIGN PATENT DOCUMENTS

| | | |
|---|---|---|
| JP | 11-141383 | 5/1999 |
| JP | 2002-155777 | 5/2002 |
| JP | 2002-164905 | 6/2002 |
| JP | 2002347569 A * | 12/2002 |
| JP | 2003033048 A * | 1/2003 |
| WO | WO 2004/037614 | 5/2004 |

OTHER PUBLICATIONS

Notice of Reason(s) for Rejection for JP 2003-156764, drafting date Jan. 28, 2008.

* cited by examiner

AUTOMOTIVE VEHICLE WITH REDUNDANT CONTROLLER

The present application is based on Japanese Patent Application No. 2003-156764 filed Jun. 2, 2003, the contents of which are incorporated herein by reference.

BACKGROUND OF THE INVENTION

1. Field of the Invention

The present invention relates to the improvement of reliability, or the reduction of failure rate, of an automotive vehicle comprising a redundant controller including a plurality of redundant elements.

2. Discussion of Related Art

An automotive vehicle is comprised of a great number of components such as parts, subassemblies, etc. Therefore, the reliability of the automotive vehicle as a whole cannot be increased to a sufficiently high degree, i.e., the failure rate of the vehicle cannot be decreased to a sufficiently low degree, unless the reliability of each of the components can be increased to a significantly high degree, i.e., unless the failure rate of the each component can be decreased to a significantly low degree. In fact, however, there are some limits to the improvements of reliability of components, and there are some cases where, though the improvements of reliability of components are technically possible, the production costs of the improved components are significantly increased and accordingly those components are not practically usable. Hence, it has been practiced to make an important component of an automotive vehicle redundant, i.e., double, triple, or more, so that even if one of the redundant components may fail, the automotive vehicle as a whole can continue to function. Meanwhile, there has been a tendency that various important functions of an automotive vehicle are electronically controlled. For example, an electronically controlled braking system is used in a commercially available automotive vehicle, and use of an electronically controlled steering system is on the table. However, generally, electronic parts are more sensitive than mechanical parts, and accordingly respective rates of malfunctions and/or failures of the electronic parts are higher than those of the mechanical ones. Therefore, there is a greater need to make electronic parts redundant.

However, it is not easy to achieve a target, or a higher, degree of reliability of an automotive vehicle as a whole, and various countermeasures have been proposed. For example, Patent Document 1 (Japanese Patent Publication No. 9-151780) discloses two electronic control units which control respective objects in an automotive vehicle and each one of which includes a primary CPU (central processing unit) and a secondary CPU that monitor each other with respect to their operations. If the respective operations of the two CPUs are both normal, the each one control unit sends, to the other control unit, an electric signal indicative of the fact. Thus, the two electronic control units monitor each other with respect to their operations. Patent Document 2 (Japanese Patent Publication No. 6-15333) discloses a plurality of electric motors which are connected, parallel to each other, to a battery. When the voltage of the battery is not normal, the supply of electricity from the battery is cut, first, from one of the electric motors that least influences the running function of a vehicle, and is cut last from a power steering motor as the last one of the electric motors. Patent Document 3 (Japanese Patent Publication No. 5-125971) discloses an electrically operated rear-wheel steering apparatus. When a steering angle of rear wheels of a vehicle is abnormally fixed because of a failure of the steering apparatus, then a degree of opening of a throttle is restrained to keep safety. More specifically described, in the case where the abnormally fixed steering angle of the rear wheels is large enough to influence substantially the running function of the vehicle, the degree of opening of the throttle is largely restrained; and in the case where the abnormally fixed steering angle is not so large as to influence the running function, the degree of opening of the throttle is not restrained so largely.

SUMMARY OF THE INVENTION

It is therefore an object of the present invention to solve at least one of the above-identified problems. It is another object of the invention to provide an automotive vehicle which can enjoy, as a whole, a high degree of reliability though it may be comprised of a plurality of components whose respective degrees of reliability are not so high. These objects may be achieved according to any one of the following modes of the present invention in the form of an automotive vehicle, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without at least one of the features described with respect to the same mode.

(1) An automotive vehicle having a pre-selected function, the vehicle comprising at least one controller which controls an object and includes a plurality of redundant elements which are redundant with each other; and at least one function restraining portion which at least partially restrains the function of the vehicle, when at least a pre-selected failure which has occurred to one of the redundant elements has not solved before an other of the redundant elements has operated more than a pre-set time since an occurrence of the failure.

As explained above, many electronic controllers are more difficult to improve their reliability, than mechanical controllers. Therefore, the present invention is advantageously applied to an automotive vehicle comprising an electronic controller including a plurality of redundant elements. However, the present invention is also applicable to an automotive vehicle comprising a mechanical controller including a plurality of redundant elements. The "pre-selected failure" may be a failure which is pre-selected based on, e.g., to which one of N-th-order (e.g., double or triple) redundant elements (N is a natural number not smaller than two) the failure occurs, to which portion of each redundant element the failure occurs, and which degree of importance the failure has.

In the case where the pre-selected failure occurs to one of the redundant elements of the controller, the controller as a whole can be prevented, to some degree, from falling in a state in which the controller cannot function at all, if the driver is informed of this fact and is advised to repair the pre-selected failure (or not only the pre-selected failure but also one or more other failures). However, the driver may not repair the failure, or may not order a shop to repair the failure. Hence, in the present automotive vehicle, when at least the pre-selected failure which has occurred to one of the redundant elements has not solved before another of the redundant elements has operated for more than the pre-set time since the occurrence of the failure, the function restraining portion partially or fully restrains the pre-selected function of the vehicle. Thus, the prevent vehicle can surely make the driver to repair the failure, and accordingly can enjoy an improved reliability. Since thus it can be presupposed that the pre-selected failure is surely repaired within the pre-set time, the reliability of the controller as a whole can be improved as compared with that of a controller for which it cannot be presupposed, as will be described in detail, later, even though respective reliabilities of the components used to provide the two controllers may be level with each other. Eventually, the vehicle can enjoy an improved reliability. In view of a need to make it sure that the driver will repair the failure, it is desirable that the pre-selected function of the vehicle be related to a running function of the same, and it is most desirable that the function restraining portion be one which makes the vehicle unable to run any more. However, in case the pre-selected failure is not repaired within the pre-set time, it is preferred to restrain partly the pre-selected function, such that the vehicle is able to run a small distance. To this end, the vehicle may be made difficult to run, e.g., able to run at a low speed only. A relationship between the pre-selected function and the degree of restraint of the function depends on a relationship between the need to repair the pre-selected failure and the inconvenience caused by the restraint of the function.

If one or more additional failures occur in the vehicle after the pre-selected failure has occurred and before the latter failure is repaired, it is preferred that all those failures be repaired. However, this is not essentially required. For example, an additionally failure may not be repaired together with the pre-selected failure. In the latter case, an additional time duration may be pre-set for the additional failure, and another time measuring operation may be started upon occurrence of the additional failure. If at least the pre-selected failure and the additional failure have not solved before the normal redundant element has operated for more than the additional pre-set time since the occurrence of the additional failure, the function restraining portion partially or fully restrains the pre-selected function of the vehicle. In this case, it is preferred to employ at least one of (a) a failure informing portion which informs the driver of the occurrence of the additional failure and (b) a repair advising portion which advises the driver to have the additional failure repaired.

(2) The automotive vehicle according to the mode (1), further comprising a failure detecting portion which detects the occurrence of the failure to at least the one of the redundant elements.

The failure detecting portion may be (A) one which includes (a1) a diagnosing portion which diagnoses whether the controller is normal (the diagnosing portion may be provided by a self-diagnosis portion of the controller, or an exclusive diagnosing device independent of the controller) and (a2) a judging portion which judges, based on the diagnosis made by the diagnosing portion, whether the pre-selected failure has occurred; or (B) one which includes only a judging portion which judges, based on information supplied from a failure detecting device, whether the pre-selected failure has occurred.

(3) The automotive vehicle according to the mode (2), further comprising a time measuring portion which measures a time which has elapsed since a detection of the occurrence of the failure by the failure detecting portion.

(4) The automotive vehicle according to any of the modes (1) through (3), further comprising a failure-solution detecting portion which detects a solution of the failure.

The failure-solution detecting portion may be (A) one which automatically detects, based on information supplied from the above-described diagnosing portion, that the pre-selected failure has solved, or (B) an input device which is operable by a person to input the same information after the repair of the pre-selected failure.

(5) The automotive vehicle according to the mode (1), further comprising a failure detecting portion which detects an occurrence of the failure to at least the one of the redundant elements; a time measuring portion which measures a time which has elapsed since a detection of the occurrence of the failure by the failure detecting portion; and a failure-solution detecting portion which detects a solution of the failure, and wherein the function restraining portion at least partially restrains the function of the vehicle, when the time measured by the time measuring portion exceeds the pre-set time before the failure-solution detecting portion detects the solution of the failure.

(6) The automotive vehicle according to any of the modes (1) through (5), further comprising at least one repair advising portion which advises a driver of the vehicle to have the vehicle repaired to solve at least the failure, in at least a time period between an occurrence of the failure to the one redundant element and the restraining of the function of the vehicle by the function restraining portion.

In the case where the driver is required to read a driver's manual explaining that the pre-selected function is restrained unless the pre-selected failure has solved before the pre-set time has elapsed since the occurrence of the pre-selected failure, a failure informing portion which informs the driver of the occurrence of the pre-selected failure may be employed as means for advising the driver to have the failure repaired. Thus, the failure informing portion can be thought as a sort of repair advising portion. However, a repair requesting portion which positively requests the driver to repair the failure within the pre-set time, is more effective.

(7) The automotive vehicle according to the mode (6), wherein the at least one repair advising portion comprises at least one continuously advising portion which continuously advises the driver to have the vehicle repaired to solve at least the failure, in at least the time period.

The continuously advising portion can surely make the driver to recognize the advice to repair the failure, or can surely make the driver not to forget the repair advice. In the case where the repair advise is displayed on a display device, or a lamp is lit to indicate the repair advice, the driver is effectively advised to repair the failure, without being disturbed.

(8) The automotive vehicle according to the mode (7), wherein the at least one continuously advising portion comprises at least one display device which continuously displays an advice that the driver should have the vehicle repaired to solve at least the failure.

(9) The automotive vehicle according to the mode (6) or (7), wherein the at least one repair advising portion advises, by using at least one of a sound and a light, the driver to have the vehicle repaired, at at least one intermediate time which has elapsed since the occurrence of the failure and is shorter than the pre-set time.

The "sound" repair advice may be a message outputted from a speaker, or an alarm produced by a buzzer. The "light" repair advice may be lighting or flickering of a lamp. It is preferred that the alarming of the buzzer or the lighting or flickering of the lamp be employed together with the displaying of the repair advice on the display device. In addition, it is desirable to advise the failure repair a plurality of times before the pre-set time has elapsed. It is more desirable that as the left time decreases, the period at which the failure repair is advised decreases. Generally, the repair advice that is continually and iteratively done is more noticeable for the driver than the repair advice that is continuously done.

(10) The automotive vehicle according to any of the modes (6) through (9), wherein the at least one repair advising portion comprises a left-time informing portion which gives, to the driver, information indicative of how long a time is left for the other redundant element to operate before the restraining of the function of the vehicle by the function restraining portion.

Since the driver is given the information indicative of how long the left time is, the driver can easily repair the failure at an appropriate timing in view of the schedule of use of the vehicle. It is desirable that the left time be given to the driver, in the form of an image displayed on a display device or in the form of a voice sound produced by a speaker.

(11) The automotive vehicle according to any of the modes (6) through (10), comprising a plurality of the repair advising portions which comprise a plurality of redundant repair advising portions which are redundant with each other.

The object of the present invention cannot be achieved unless at least the pre-selected failure is solved within the pre-set time. Therefore, if the repair advising portion is in failure when the repair advice is needed, the object of the present invention cannot be achieved. Thus, the present vehicle employs, in addition to the redundant elements of the controller, a plurality of redundant repair advising portions, so as to give surely the repair advice to the driver.

(12) The automotive vehicle according to any of the modes (1) through (11), wherein the at least one function restraining portion comprises at least one running-function restraining portion which restrains a running function of the vehicle.

(13) The automotive vehicle according to the mode (12), wherein the at least one running-function restraining portion comprises at least one of (a) a driving restraining portion which restrains a driving operation of the vehicle, e.g., stops an operation of a drive source of the vehicle, inhibits starting of an operation of the drive source, or inhibits shifting of a shift lever from a parking (P) position, and (b) a braking portion which brakes the vehicle, e.g., automatically operates a parking brake, inhibits the parking brake from being released, or automatically operates a power brake.

(14) The automotive vehicle according to the mode (12) or (13), wherein the running-function restraining portion comprises a running-resumption inhibiting portion which inhibits the running of the vehicle from being resumed when the vehicle is stopped after a left time which is left for the other redundant element to operate before the restraining of the function of the vehicle by the function restraining portion has been used to be shorter than a reference time.

The running-resumption inhibiting portion inhibits only the resumption of running of the vehicle that has been stopped, and accordingly the driver is prevented from falling in a difficult situation as compared with a case where a vehicle that is running is forcibly stopped. In particular, in the case where the driver is notified of the fact that the resumption of running of the vehicle will be inhibited, according to the mode (15) described below, the driver will stop the vehicle at an appropriate place where the inhibition causes no problems.

(15) The automotive vehicle according to the mode (14), wherein the running-function restraining portion further comprises a running-resumption-inhibition notifying portion which notifies the driver of a fact that the running of the vehicle will be inhibited from being resumed after the vehicle is stopped at a next time.

(16) The automotive vehicle according to any of the modes (12) through (15), wherein the running-function restraining portion comprises a forcibly stopping portion which forcibly stops the vehicle when the vehicle has not been stopped after a left time which is left for the other redundant element to operate before the restraining of the function of the vehicle by the function restraining portion has been used to be shorter than a reference time and before the left time has been used up.

If the driver does not repair the failure, or stop the vehicle, before the left time is used up, the vehicle must be forcibly stopped. However, it is desirable to employ a forcible-stopping notifying portion according to the mode (17) described below, so that the driver is allowed to move the vehicle to a near place where the vehicle does not disturb other vehicles.

(17) The automotive vehicle according to the mode (16), wherein the running-function restraining portion further comprises a forcible-stopping notifying portion which notifies, before a forcible stopping of the vehicle by the forcibly stopping portion, the driver of a fact that the vehicle will be forcibly stopped by the forcibly stopping portion.

(18) The automotive vehicle according to any of the modes (12) through (17), wherein the running-function restraining portion comprises a running-speed limiting portion which limits a running speed of the vehicle so as to be lower than a pre-set upper limit.

The pre-set upper limit may be one which assures that the driver can move, and stop, the vehicle to, and at, a near place where the vehicle does not disturb other vehicles, and which is lower than common running speeds. This condition is substantially the same as the condition that the vehicle is completely inhibited from running, and is freed of inconveniences caused by the complete inhibition.

(19) An automotive vehicle having a pre-selected function, and comprising at least one controller which controls an object and includes a plurality of redundant elements which are redundant with each other, the automotive vehicle being characterized by further comprising at least one function restraining portion which at least partially restrains the function of the vehicle, when at least a first pre-selected failure which has occurred to one of the redundant elements has not solved before an other, normal redundant element has operated, since an occurrence of the first failure, more than a pre-set time which assures that a probability that a second pre-selected failure may occur to the normal redundant element within the pre-set time is smaller than a target probability.

Providing that the degree of redundancy of the redundant elements of the controller is N-th order (N is a natural number not smaller than two), the first pre-selected failure may be a failure that N−M redundant element or elements (N>M) is or are out of order; and the second pre-selected failure may be a failure that M−P redundant element or elements (M>P) is or are out of order. For example, the first pre-selected failure may be a failure that N−1 redundant element or elements is or are out of order and, in this case, the second pre-selected failure is a failure that the controller cannot operate any more.

According to this mode, the pre-set time assures that the probability that the second pre-selected failure may occur is smaller than the target probability. Therefore, the vehicle can enjoy a target, high degree of reliability.

The automotive vehicle according to the mode (19) may be modified according to any of the modes (2) through (18).

(20) The automotive vehicle according to the mode (19), comprising a plurality of the function restraining portions which comprise a plurality of redundant function restraining portions which are redundant with each other.

Since the present vehicle employs a plurality of redundant function restraining portions in addition to the redundant elements of the controller, the pre-selected function of the vehicle can be restrained with high reliability.

(21) The automotive vehicle according to any of the modes (1) through (20), wherein the object comprises at least one operating device which has at least one function different from the pre-selected function of the vehicle.

(22) The automotive vehicle according to the mode (21), wherein the pre-selected function of the vehicle comprises a running function of the vehicle, and wherein the at least one operating device comprises at least one steering actuator which produces at least a portion of a force to change an angle of at least one steered wheel of the vehicle.

(23) The automotive vehicle according to any of the modes (1) through (22), wherein the redundant elements comprise at least one of (a) a plurality of redundant sensors, (b) a plurality of redundant control devices, and (c) a plurality of redundant actuators.

(24) The automotive vehicle according to the mode (23), wherein the redundant elements comprise a plurality of steering-member operation-amount sensors each one of which detects, independent of the other steering-member operation-amount sensor or sensors, an amount of operation of a steering member of the vehicle that is operated by a driver to input a desired steering angle.

(25) The automotive vehicle according to the mode (23) or (24), wherein the redundant elements comprise a plurality of steering actuators each one of which can produce, independent of the other steering actuator or actuators, at least a portion of a force to change an angle of at least one steered wheel of the vehicle.

(26) The automotive vehicle according to the mode (25), wherein the redundant elements further comprise a plurality of steering control devices each one of which can control, based on the amount of operation of the steering member detected by a corresponding one of the steering-member operation-amount sensors, a corresponding one of the steering actuators so as to produce at least a portion of a force to change the angle of the at least one steered wheel to the desired steering angle, independent of the other steering control device or devices.

DETAILED DESCRIPTION OF THE PREFERRED EMBODIMENTS

Figure 1:
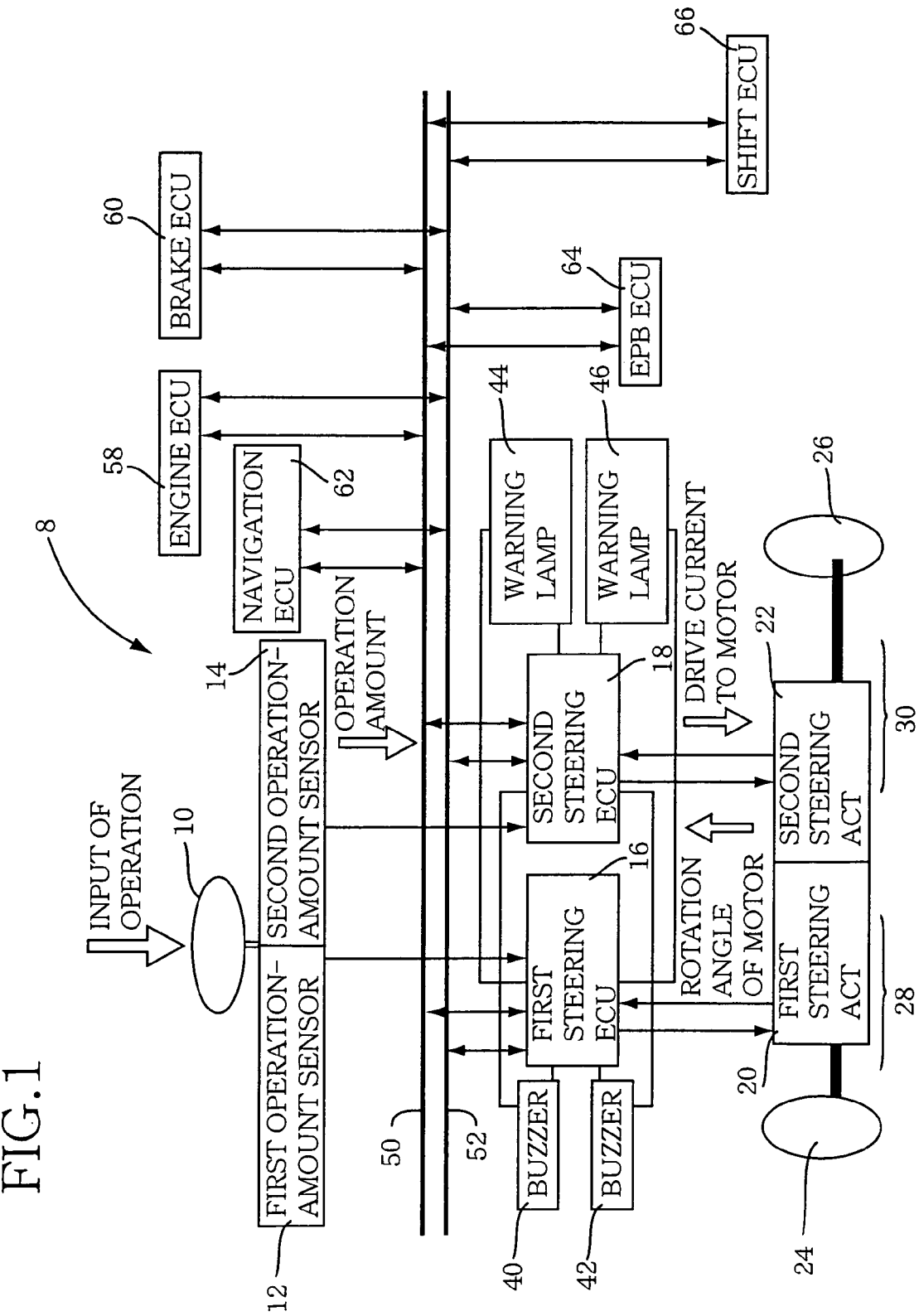
FIG. 1 is a schematic view of an electronically controlled steering system, and its peripheral elements, of an automotive vehicle as an embodiment of the present invention.

Hereinafter, there will be described in detail, by reference to the drawings, an embodiment of the present invention. FIG. 1 schematically shows an electronically controlled steering system 8, and its peripheral elements, of an automotive vehicle to which the present invention is applied. The electronically controlled steering system 8 includes a steering member (e.g., a steering wheel) 10 as an operable portion which is operable by a driver to input his or her desired steering angle; a first and a second operation-amount sensor 12, 14 each of which detects an operation amount (e.g., a rotation angle) of the steering member 10; a first and a second steering actuator (hereinafter, referred to as the first and second steering ACTs) 20, 22 each of which produces at least a portion of a force to steer two steered wheels 24, 26; and a first and a second steering electronic control unit (hereinafter, referred to as the first and second steering ECUs) 28, 30 each of which controls, based on the operation amount detected by a corresponding one of the first and second operation amount sensors 12, 14, a corresponding one of the first and second steering ACTs 20, 22, to steer the two steered wheels 24, 26. Thus, the first operation amount sensor 12, the first steering ECU 16, and the first steering ACT 20 cooperate with each other to provide a first steering system (hereinafter, referred to as the first system) 28; and the second operation amount sensor 14, the second steering ECU 18, and the second steering ACT 22 cooperate with each other to provide a second steering system (hereinafter, referred to as the second system) 30. Thus, the electronically controlled steering system 8 is a double (i.e., $2^{nd}$ order or degree) redundant system.

Each of two buzzers 40, 42 and two warning lamps 44, 46 is connected to each of the first and second steering ECUs 16, 18. Since the first buzzer 40 is doubly connected to the first and second steering ECUs 16, 18, the first buzzer 40 can be operated by each steering ECU 16, 18. This is true with each of the second buzzer 42 and the first and second warning lamps 44, 46. Each of the first and second steering ECUs 16, 18 is connected to each of a first and a second communication bus 50, 52. Likewise, each of an engine electronic control unit (hereinafter, referred to as the engine ECU) 58, a brake electronic control unit (hereinafter, referred to as the brake ECU) 60, a navigation system electronic control unit (hereinafter, referred to as the navigation ECU) 62, an electrically operated parking brake electronic control unit (hereinafter, referred to as the EPB ECU) 64, and a transmission shift electronic control unit (hereinafter, referred to as the shift ECU) 66 is connected to each of the first and second communication buses 50, 52.

The first and second steering ECUs 16, 18 cooperate with each other to provide respective double redundant arrangements of CPUs, memories, and input and output circuits, and each of the two steering ECUs 16, 18 operates, according to a predetermined control program, to detect a failure as a result of self-diagnosis and, upon detection of the failure, stop operating a corresponding one of the two steering ACTs 20, 22, stop communicating with the communication buses 50, 52, and command the warning lamps 44, 46 and the buzzers 40, 42 to start and stop their operations. The first and second steering ACTs 20, 22 are exclusively controlled by the first and second steering ECUs 16, 18, respectively, whereas each of the warning lamps 44, 46 and the buzzers 40, 42 is operated according to a command supplied from either one of the first and second steering ECUs 16, 18.

Each of the first and second steering ECUs 16, 18 monitors a failure of each of the first and second systems 28, 30 and, after detecting the failure of either one of the two systems 28, 30, iteratively advises the driver to have the failure repaired. If a time of operation of the electronically controlled steering system 8 after the detection of the failure exceeds a pre-set time without repairing of the failure, then each steering ECU 16, 18 forcibly stops the running of the automotive vehicle. Each of the first and second steering ECUs 16, 18 controls the navigation ECU 62, the warning lamps 44, 46, and the buzzers 40, 42, and changes a control rule according to which each of the steering ACTs 20, 22 is controlled, so as to advise the driver to have the failure repaired. In addition, each steering ECU 16, 18 commands the engine ECU 58, the brake ECU 60, the EPB ECU 64, and the shift ECU 66, to make the vehicle unable to run further. The above-indicated pre-set time is so pre-set as to assure, as will be explained in detail later, that a probability that after one system fails, the other system also fails within that time and accordingly the steering system 8 becomes unable to function any longer is lower than a target probability.

In the present embodiment, a failure of one of the double redundant systems is defined as a first pre-selected failure; a failure of the other system in addition to the first pre-selected failure is defined as a second pre-selected failure; and the running function of the automotive vehicle is defined as a pre-selected function of the same.

When the engine ECU 58 receives, from either one of the first and second steering ECUs 16, 18, the command to stop the running of the automotive vehicle, the engine ECU 58 selects an idling mode and controls an engine, not shown, in the thus selected, and fixed, idling mode. In addition, the brake ECU 60 automatically places a hydraulic braking device as a service brake, not shown, in a braking mode. Since many recent hydraulic braking devices have the function of automatically operating in a braking mode, for the purpose of performing a traction control to prevent excessive accelerative slips of drive wheels, not shown, a vehicle stability control to secure the running stability of the vehicle, or a hill-hold control to keep automatically the vehicle stopped on a hill, they can utilize the function. The EPB ECU 64 places an electrically operated parking brake, not shown, driven by an electric motor, also not shown, in an operating mode; and the shift ECU 66 selects a parking range or position, and shifts a transmission, not shown, to the thus selected, and locked, position. In the present embodiment, the above-described running restraining portions 58, 60, 64, 66, and respective portions of the first and second steering ECUs 16, 28 that supply respective commands to those restraining portions cooperate with each other to provide a running inhibiting portion as a sort of running-function restraining portion as a sort of pre-selected function restraining portion.

If one of the above-described running restraining portions 58, 60, 64, 66 is employed, then the automotive vehicle can be completely inhibited from running, or restrained from running to some degree. However, it is preferred to employ two or more of those running restraining portions. In the case where two or more running restraining portions are employed and operated, the running of the vehicle can be reliably inhibited or restrained. In case one of the running restraining portions employed fails, the remaining, normal restraining portions can prevent the running of the vehicle. In this sense, it can be said that the present automotive vehicle employs the fourth-order redundant running restraining portions.

Figure 2:
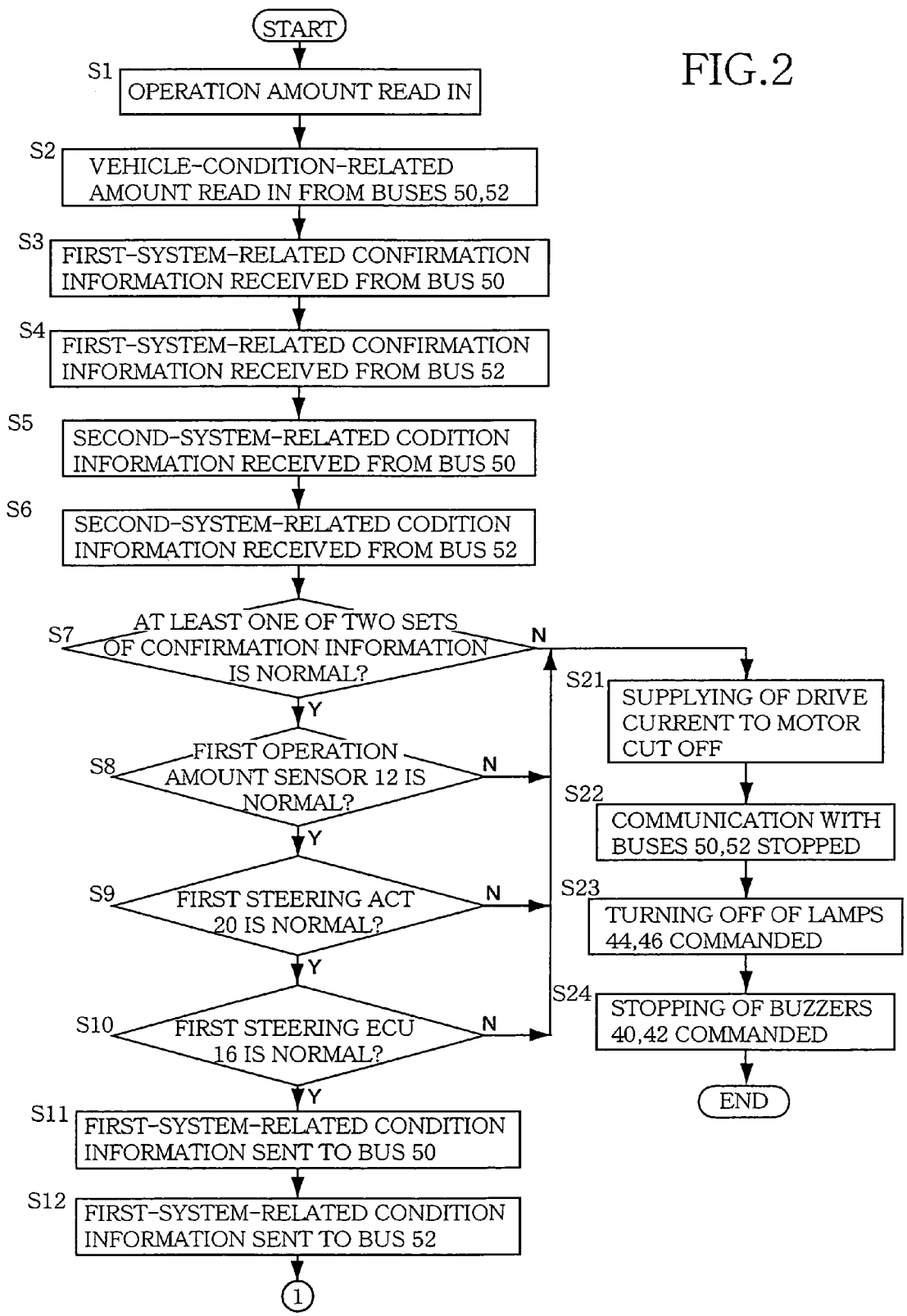
FIG. 2 is a flow chart representing a portion of a control program that is stored by a ROM (read only memory) of a computer of each of a plurality of control units of the electronically controlled steering system.
Figure 3:
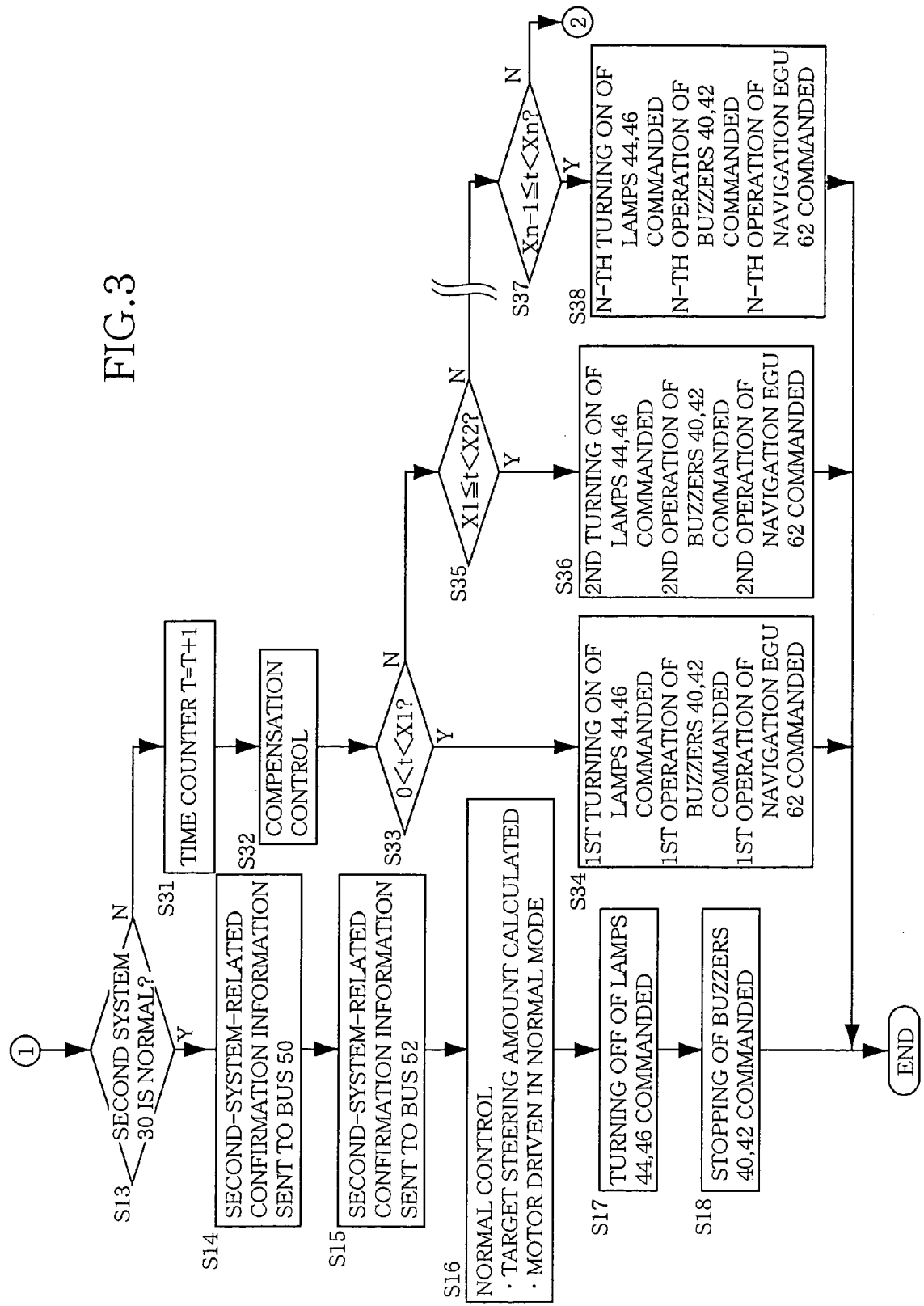
FIG. 3 is a flow chart representing another portion of the control program.
Figure 4:
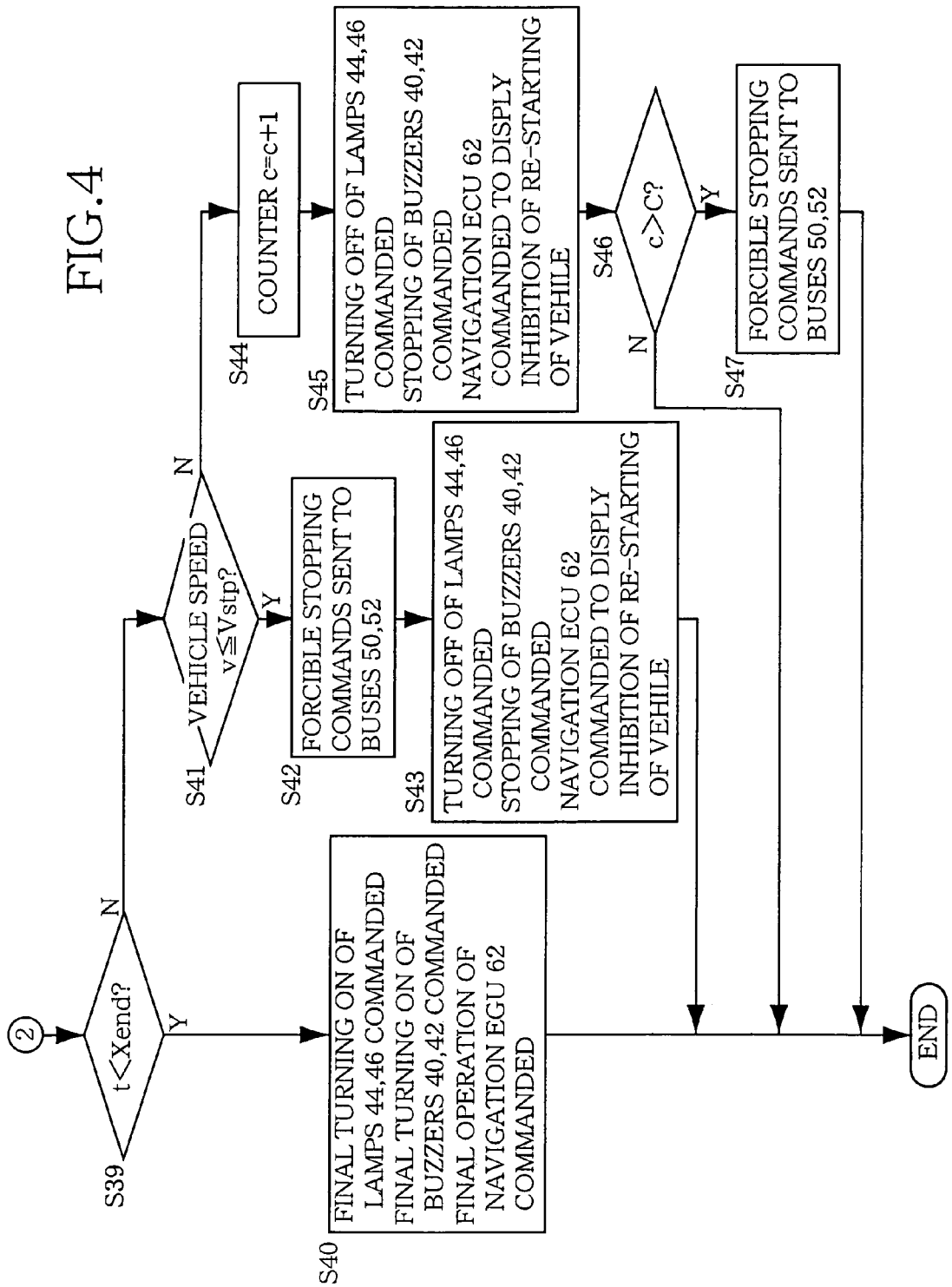
FIG. 4 is a flow chart representing yet another portion of the control program.

The memory of the first steering ECU 16 stores, for the purpose of giving the above-described advice to repair the failure, and performing the forcible stopping of the automotive vehicle, a first control program represented by the flow charts shown in FIGS. 2, 3, and 4; and the memory of the second steering ECU 18 stores a second control program that is identical with the first control program stored by the memory of the first steering ECU 16, except that in the second control program, the first system 28 and the components thereof are replaced with the second system 30 and the components thereof, respectively. Hereinafter, there will be described the operation of the automotive vehicle employing the electronically controlled steering system 8, by reference to the flow charts of FIGS. 2 to 4.

The control program represented by the flow charts of FIGS. 2 through 4 are iteratively carried out while a main switch, such as an ignition switch, of the automotive vehicle is kept ON. First, at Step S1, the first steering ECU 16 reads in an amount of operation of the steering member 10 that is detected by the first operation-amount sensor 12. The thus read-in operation amount will be used, later, to control the first steering ACT 20. Subsequently, at Step S2, the ECU 16 reads in, from each of the two communication buses 50, 52, a vehicle-condition-related amount. In the present embodiment, the ECU 16 reads in a running speed of the vehicle. Then, at Step S3, the first steering ECU 16 receives, from the second system 30, i.e., the second steering ECU 18 thereof via the first communication bus 50, confirmation information confirming that the first system 28 is normal and, at Step S4, the first ECU 16 receives confirmation information identical with the above-indicated confirmation information, from the second communication bus 52. That is, the first ECU 16 transmits and receives the two identical sets of confirmation information via the two communication buses 50, 52, respectively. This is true with other sorts of information, described later. The production of the confirmation information confirming that the first system 28 is normal will be explained, later, in connection with the production of confirmation information confirming that the second system 30 is normal.

At Step S5, the first ECU 16 receives, from the first communication bus 50, condition information indicative of a condition of the second system 30; and at Step S6, the first ECU 16 receives, from the second communication bus 52, identical condition information indicative of the condition of the second system 30. Those two sets of condition information are indicative of whether the second system 30 is normal, and are produced and transmitted by the second steering ECU 18. The production of the condition information indicative of the condition of the second system 30 will be explained in detail, later, in connection with the production of condition information indicative of a condition of the first system 28. At Step S7, the first ECU 16 judges whether the ECU 16 has received, from at least one of the two communication buses 50, 52, the confirmation information confirming that the first system 28 is normal. This judgment is made for checking whether the communications of the first system 28 with the second system 30 via the two communication buses 50, 52 are normal. A positive judgment, YES, made at this step indicates that the communications are normal.

At Step S8, the first ECU 16 judges whether the first operation amount sensor 12 is normal; and at Step S9, the first ECU 16 judges whether the first steering ACT 20 is normal. If a positive judgment is made at each of Steps S8 and S9, the control goes to Step S10 where the first ECU 16 makes a self-diagnosis about whether the first ECU 16 itself is normal. If a positive judgment is made at each of Steps S7 through S10, then it can be concluded that the first system 28 is normal. Hence, the control goes to Step S11 where the first ECU 16 produces condition information indicating that the first system 28 is normal, and sends it to the first communication bus 50, and then goes to Step S12 where the first ECU 16 produces identical condition information and sends it to the second communication bus 52. The above-described Steps S5, S6 are the steps where the first steering ECU 16 receives the two sets of condition information that are produced by the second steering ECU 18 and correspond to the two sets of condition information produced by the first steering ECU 16.

Subsequently, at Step S13, the first ECU 16 judges whether the two sets of condition information each indicative of the condition of the second system 30, received from the two communication buses 50, 52 at Steps S5, S6, are each indicative of the normal condition of the second system 30. If a positive judgment YES is obtained at Step S13, the control goes to Step S14 where the first ECU 16 sends, to the first communication bus 50, confirmation information confirming that the second system 30 is normal, and then goes to Step S15 where the first ECU 16 sends, to the second communication bus 52, confirmation information confirming that the second system 30 is normal. The above-described Steps S3, S4 are the steps where the first steering ECU 16 receives the two sets of confirmation information that are produced by the second steering ECU 18 and correspond to the two sets of confirmation information produced by the first steering ECU 16. Then, at Step S16, the first ECU 16 performs a common steering control operation. More specifically described, the first ECU 16 calculates, based on the operation amount of the steering member 10, read in at Step S1, a target steering amount or angle of the first steering ACT 20, and normally drives, based on the calculated target steering angle, an electric motor, not shown, of the first steering ACT 26. Then, at Step S17, the first ECU 16 supplies commands to turn off the warning lamps 44, 46; and at Step S18, the first ECU 16 supplies commands to turn off the buzzers 40, 42. Thus, one control cycle according to this control program is finished. This is an operation of the vehicle when the first and second systems 28, 30 are normal.

On the other hand, if a negative judgment, NO, is made at any of Steps S7 through S10, the first ECU 16 judges that a pre-selected failure has occurred to the first system 28. Hence, the control goes to Step S21 to cut off the supplying of drive electric current to the electric motor of the first steering ACT 26; and then goes to Step S22 to stop sending electric signals to the two communication buses 50, 52. In addition, at Step S23, the first ECU 16 outputs the commands to turn off the warning lamps 44, 46 and, at Step S24, the first ECU 16 outputs the commands to stop the buzzers 40, 42. Thus, one control cycle according to the control program is finished. That is, when the first steering ECU 16 detects that the pre-selected failure has occurred to the first system 28, the first ECU 16 stops controlling the first system 28.

In addition, if a negative judgment NO is made at Step S13, i.e., if the first ECU 16 detects that a pre-selected failure has occurred to the second system 30, the control goes to Step S31 to add one to a number counted by a timer. This timer is reset when the assembling of the automotive vehicle is finished, and when the repairing of the second system 30 is finished. The counted number represents a time duration or period in which the control program has been carried out since the detection of the pre-selected failure of the second system 30, i.e., an operation time, t, of the electronically controlled steering system 8 since the detection (hereinafter, simply referred to as the "after-failure operation time t"). Thus, the after-failure operation time t is equal to the product of the counted number and a cycle time needed to carry out the control program one time. Since, in the first ECU 16, the counted number is not deleted, and is kept, even after the main switch of the vehicle is turned OFF, the after-failure operation time t indicates an accumulative operation time of the steering system 8 after the detection of the failure. Moreover, since the control program is iteratively carried out while the main switch of the vehicle is kept on, the after-failure operation time t indicates an accumulative operation or use time of the vehicle.

Step S31 is followed by Step S32, i.e., a compensation control, described below. In the present automotive vehicle, when a great steering force is needed because the running speed of the vehicle is low and accordingly frictional forces produced between the steered wheels 24, 26 and the road surface are great, the first and second steering ACTs 20, 22 cooperate with each other to steer the wheels 24, 26; and when just a small steering force is needed because the running speed of the vehicle is high and the frictional forces produced between the steered wheels 24, 26 and the road surface are small, only a selected one of the first and second steering ACTs 20, 22 steers the wheels 24, 26, at an appropriate force. In the latter case, the first and second steering ACTs 20, 22 may be each controlled to steer the steered wheels 24, 26 at half the force. Therefore, in the state in which the second system 30 has failed, when the running speed of the vehicle is high, naturally the first steering ACT 20 steers the steered wheels 24, 26; but, when the running speed of the vehicle is low, the first steering ACT 20 is controlled to steer the wheels 24, 26 at a greater force than a usual force. This is the compensation control to compensate for the lost steering force of the second system 30 that has failed.

Subsequently, at Step S33, the first ECU 16 judges whether the after-failure operation time t is shorter than a first pre-set operation time, X1. Initially, a positive judgment YES is made at Step S33, and the control goes to Step S34 to advise the driver to have the vehicle repaired. More specifically described, the first ECU 16 turns on the warning lamps 44, 46, operates or starts the buzzers 40, 42, and sends a command to the navigation ECU 62 so that according to the command, the navigation ECU 62 controls a display device of the navigation device to display a message that the second system 30 has failed and should be repaired, and a pre-set time left before the running of the vehicle is forcibly restrained. The display device continues to display the message and the time till the failure is repaired.

If the driver has, according to the displayed advice, the second system 30 repaired before the after-failure operation time t exceeds the first pre-set operation time X1, then a positive judgment YES is made at Step S13. In addition, the counted number t is reset when the repair is finished, or the control according to this control program is initialized. On the other hand, if the driver does not repair the vehicle, eventually the after-failure operation time t exceeds the first pre-set operation time X1 and accordingly a negative judgment NO is made at Step S33. Hence, the control proceeds with Step S35 to judge whether the after-failure operation time t is shorter than a second pre-set operation time, X2, that is longer than the first pre-set operation time X1. Initially, a positive judgment YES is made at Step S35, and the control goes to Step S36 to turn on the warning lamps 44, 46, and operates the buzzers 40, 42, for a time duration increased as compared with that employed at Step S34. In addition to, or in place of, the increase of the time duration, a degree of brightness of the light emitted by each of the lamps 44, 46 and/or a degree of loudness of the sound emitted by each of the buzzers 40, 42 may be increased. Thus, the driver is informed that the repair of the vehicle is more strongly advised. In addition, the display device of the navigation device displays the left time that has been decreased as compared with the pre-set time.

If the after-failure operation time t exceeds the second pre-set operation time X2 before the failure is repaired, a negative judgment NO is made at Step S35. Eventually, the control goes to Step S37 to judge whether the after-failure operation time t is not shorter than an (n−1)-th pre-set operation time, $X_{n-1}$, and shorter than an n-th pre-set operation time, $X_n$. If a positive judgment is made at Step S37, the first ECU 16 operates for more strongly advising the driver to have the failure repaired, for the n-th time, at Step S38. Then, if the after-failure operation time t exceeds the n-th pre-set operation time $X_n$ before the failure is repaired, a negative judgment NO is made at Step S37, and the control goes to Steps S39 and the following steps where the first ECU 16 gives the driver the final advice to repair the failure. At Step S39, the first ECU 16 judges whether the after-failure operation time t is shorter than a final pre-set operation time, Xend. If a positive judgment is made at Step S39, the control goes to Step S40 to continue turning on the warning lamps 44, 46 and continue operating the buzzers 40, 42. In addition, the first ECU 16 controls the display device of the navigation device to display a decreased left time and a message that the vehicle will be forcibly stopped unless the second system 30 is repaired within the left time.

If, however, the automotive vehicle is run with the failure being not repaired and the after-failure operation time t is increased to be not smaller than the final pre-set operation time Xend, a positive judgment YES is made at Step S39, and the control goes to Step S41 where the first ECU 16 waits for the running speed, v, of the vehicle to lower to be not higher than a pre-set speed, Vstp, that is a very low speed. If a positive judgment YES is made at Step S41, the first ECU 16 can judge that the vehicle is substantially stopped, and accordingly the control goes to Step S42 to send, to the two communication buses 50, 52, respective commands to stop forcibly the vehicle. According to either one of the commands, the engine ECU 58 stops the engine and makes the same unable to be re-started; the brake ECU 60 operates the hydraulic braking device; the EPB ECU 64 operates the electric parking brake; and the shift ECU 66 shifts, and locks, the transmission to, and at, the parking position. Thus, once the vehicle is stopped, the vehicle cannot be re-started any more. Subsequently, at Step S43, the first ECU 16 turns off the warning lamps 44, 46 and stops the buzzers 40, 42. In addition, the first ECU 16 controls the display device of the navigation device to display a message that since the failure of the electronic steering system 8 has not been repaired within the pre-set time, the vehicle has been made unable to run any more on its own.

In addition, in the case where the driver does not stop the vehicle within a pre-set time duration after the after-failure operation time t has been increased to be not shorter than the final pre-set operation time Xend, the first ECU 16 operates for forcibly stopping the vehicle. More specifically described, if a negative judgment NO is made at each of Steps S39 and S41, the control goes to Step S44 where the first ECU 16 adds one to a number, c, counted by a counter, subsequently goes to Step S45 where the first ECU 16 prepares for forcibly stopping the vehicle, and then goes to Step S46 to wait for the counted number c to be increased up to a pre-set number, C. At Step S45, the first ECU 16 turns off the warning lamps 44, 46 and stops the buzzers 40, 42. In addition, the first ECU 16 commands the navigation ECU 62 to control the display device of the navigation device to display a message that after a considerably short extension time (e.g., 5 minutes), the vehicle will be forcibly stopped. If the counted number c is increased up to the pre-set number C, a positive judgment YES is made at Step S46, and the control goes to Step S47 where the first ECU 16 sends, to the two communication buses 50, 52, respective commands to stop forcibly the vehicle. According to either of the commands, the engine ECU 58, the brake ECU 60, the EPB ECU 64, and the shift ECU 66 operate in the same manner as that employed at Step S43, so that the vehicle is forcibly stopped and is made unable to run any more on its own.

As the first system 28 is controlled by the first steering ECU 16 in the above-described manner, the second system 30 is concurrently controlled by the second steering ECU 18 in the same manner. If one of the first and second systems 28, 30 fails before the other system fails, the steering ECU of the other system advises the driver to have the failure repaired, such that the repair advice becomes more and more strongly as the left time decreases. In particular, after the final pre-set operation time Xend has elapsed, if the driver stops the vehicle within the considerably short extension time, the ECU makes the vehicle unable to run any more and, if the driver continues to run the vehicle over the extension time, the ECU forcibly stops the vehicle.

As is apparent from the foregoing description, the final pre-set operation time Xend is an example of a pre-set time recited in claims, and is so determined as to assure that a probability that, after a first pre-selected failure occurs to one of the first and second systems 28, 30 of the double redundant electronic steering system 8 of the vehicle, a second pre-selected failure may occur to the other, normal system within the pre-set time (i.e., a probability that the double redundant system completely looses its function) is smaller than a target probability. Hereinafter, there will be explained the manner in which the final pre-set operation time Xend is determined.

First, a manner in which a failure rate of a double redundant system including two redundant elements A, B is calculated is explained. Symbols and terms used in the following explanation are defined as follows:

$\lambda_A$: a failure rate of element A (i.e., a rate of a chance failure of element A that does not depend on time and is represented by a constant value)

$\lambda_B$: a failure rate of element B (i.e., a rate of a chance failure of element B that does not depend on time and is represented by a constant value)

$r_{(t)}$: a reliability of an element (i.e., a probability that the element will satisfactorily perform its intended function under given circumstances, at an arbitrary time, t)

$f_{(t)}$: an unreliability of an element (i.e., a probability that the element will be in failure at the arbitrary time t)

$r_{A(t)}$: a reliability of element A $r_{B(t)}$: a reliability of element B $\Lambda_{(t)}$: a failure rate of the double redundant system $R_{(t)}$: a reliability of the double redundant system A relationship between reliability $r_{(t)}$ and unreliability $f_{(t)}$ is represented by the following expression:

$$f_{(t)} = 1 - r_{(t)}$$

A failure rate, $\lambda_{(t)}$, i.e., a probability that an element will fail in the next unit time is represented by the following expression:

$$\lambda_{(t)} = (-dr_{(t)}/dt)/r_{(t)}$$

where $-dr_{(t)}/dt$ is a probability that the element will fail in unit time.

A probability, $P_{BA}$, that element B will be in failure at the arbitrary time t and element A will fail in the next unit time is represented by the following expression (1):

$$P_{BA} = (1 - r_{B(t)}) \cdot \lambda_A \cdot r_{A(t)} \tag{1}$$

Likewise, a probability, $P_{AB}$, that element A will be in failure at the arbitrary time t and element B will fail in the next unit time is represented by the following expression (2):

$$P_{AB} = (1 - r_{A(t)}) \cdot \lambda_B \cdot r_{B(t)} \tag{2}$$

A probability that the double redundant system will survive at the arbitrary time t (i.e., the reliability $R_{(t)}$ of the system) is represented by the following expression (3):

$$R_{(t)} = 1 - (1 - r_{B(t)}) \cdot (1 - r_{A(t)}) \tag{3}$$

Therefore, the failure rate $\Lambda_{(t)}$ of the double redundant system is derived from the above-indicated definition of the failure rate $\lambda_{(t)}$, and is represented by the following expression (4):

$$\Lambda_{(t)}=(P_{BA}+P_{AB})/R_{(t)}=[(1-r_{B(t)})\cdot\lambda_A\cdot r_{A(t)}+(1-r_{A(t)})\cdot\lambda_B\cdot r_{B(t)}]/[1-(1-r_{B(t)})\cdot(1-r_{A(t)})] \quad (4)$$

By the way, if the following condition is satisfied: $\lambda_{(t)}=(-dr_{(t)}/dt)/r_{(t)}=\lambda$ (constant), then the reliability $r_{(t)}$ is obtained as follows:

$$r_{(t)}=e\cdot\lambda^t$$

Here, since the following condition is satisfied: $\lambda\ll 1$, the following expression is obtained:

$$r_{(t)}=e\cdot\lambda^t\approx 1-\lambda\cdot t$$

Therefore, the following expression is obtained:

$$\Lambda_{(t)}\approx[\lambda_A\cdot\lambda_B\cdot t\cdot[(1-\lambda_A\cdot t)+(1-\lambda_B\cdot t)]]/(1-\lambda_A\cdot\lambda_B\cdot t^2)$$

And, since the following conditions are satisfied: $\lambda_A\cdot t\ll 1$, $\lambda_B\cdot t\ll 1$, the following expression is obtained:

$$\Lambda_{(t)}\approx 2\cdot\lambda_A\cdot\lambda_B\cdot t$$

It emerges from the above expression that, in a redundant system including a plurality of redundant elements, such as electric components, whose time failure rates $\lambda_{(t)}$ are constant and which are provided in parallel to each other, a probability ($\Lambda$) that the redundant system may loose its function monotonously increases as time elapses.

In contrast, in the present embodiment in which the double redundant system includes the two identical systems 28, 30 (i.e., each of respective time failure rates thereof is $\lambda$), even if one of the two systems 28, 30 may fail, the failure of the one system is repaired within a time duration, X, after the detection of the failure. Therefore, a probability that the two systems 28, 30 are both in failure at the arbitrary time t means a probability that the two systems 28, 30 fail in a past time duration equal to the time duration X before the present time t, because a failure that had occurred before more than the time duration X should have been repaired and removed.

And, the term of $-dR_{(t)}/dt$ means a rate of lowering (i.e., a negative gradient) of the reliability of the redundant system at the arbitrary time t. Therefore, the term of $-dR_{(t)}/dt$ is obtained as the product of a reliability $R_{(t-X)}$ of the redundant system at the time X before the present time t and a probability, $[2\cdot(1-r_{(X)})\cdot\lambda\cdot r_{(X)}]$, that the two systems 28, 30 of the double redundant system that had been normal fail in the past time duration equal to the time X. Therefore, the following expression is obtained:

$$dR_{(t)}/dt=-R_{(t-X)}\cdot[2\cdot(1-r_{(X)})\cdot\lambda\cdot r_{(X)}]=-R_{(t-X)}\cdot 2\cdot\lambda\cdot e\cdot\lambda^X\cdot(1-e\cdot\lambda^X)$$

where $[2\cdot(1-r_{(X)})\cdot\lambda\cdot r_{(X)}]$ is a value of the failure rate $\Lambda_{(t)}$ that is obtained if, in the above-indicated expression (4), the following conditions are satisfied: $\lambda_A=\lambda_B\lambda$, t=X.

Here, if the following substitution is used: $A=2\cdot\lambda\cdot e\cdot\lambda^X\cdot(1-e\cdot\lambda^X)$, the following expression is obtained:

$$dR_{(t)}/dt=-A\cdot R_{(t-X)}$$

Therefore, the following expression is obtained:

$$\Lambda(t)=-(dR_{(t)}/dt)/R_{(t)}=A\cdot R_{(t-X)}/R_{(t)}$$

Here, if $\lambda\cdot X$ is significantly smaller than one (i.e., $\lambda\cdot X\ll 1$), then the term of $R_{(t-X)}/R_{(t)}$ is approximately equal to one (i.e., $R_{(t-X)}/R_{(t)}\approx 1$), and the following expression is obtained:

$$\Lambda(t)\approx A=2\cdot\lambda\cdot e\cdot\lambda^X\cdot(1-e\cdot\lambda^X)$$

Here, since $\lambda$ is significantly smaller than one (i.e., $\lambda\ll 1$), $e\cdot\lambda^X$ is approximately equal to $1-\lambda\cdot X$ (i.e., $e\cdot\lambda^X\approx 1-\lambda\cdot X$), and the following expression is obtained:

$$\Lambda\approx 2\cdot\lambda\cdot(1-\lambda\cdot X)\cdot\lambda\cdot X$$
$$=2\cdot\lambda^2\cdot X\cdot(1-\lambda\cdot X)$$
$$\approx 2\cdot\lambda^2\cdot X$$

In the present embodiment, since the respective failure rates of the two identical systems 28, 30 of the double redundant system are $\lambda$, and the target probability, i.e., the probability that the double redundant system may loose its function is $\Lambda$, the previously-indicated final pre-set operation time Xend is defined by the following expression:

$$X\text{end}=\Lambda/(2\cdot\lambda^2)$$

Figure 5A:
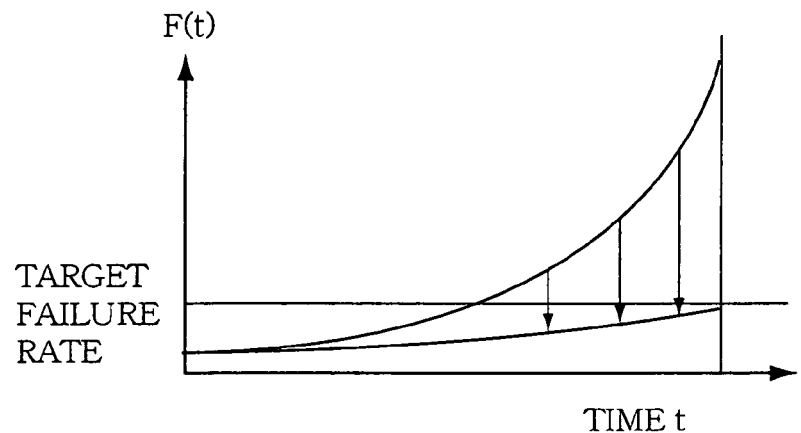
FIGS. 5A and 5B are graphs for explaining the advantages of the present invention.
Figure 5B:
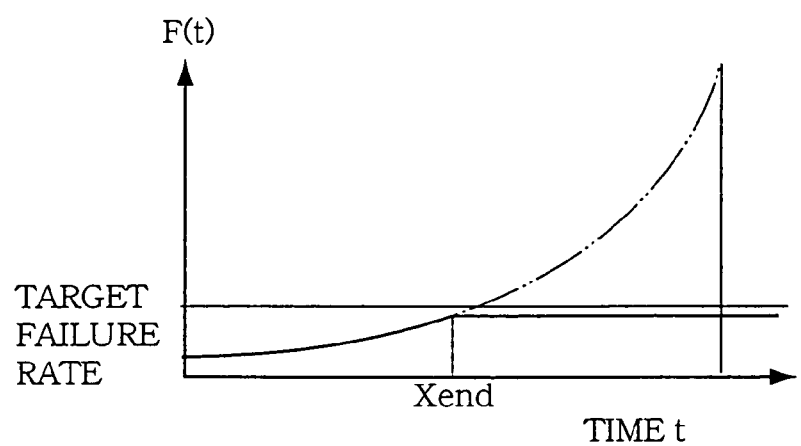

What is meant by the above expression is graphically shown in FIGS. 5A and 5B. FIG. 5A shows a case where a failure rate of a double redundant system as a whole is lowered by lowering a failure rate of each of two redundant elements of the double redundant system; and FIG. 5B shows a case where the failure rate of the double redundant system as a whole is lowered by assuring that if one of the two redundant elements fails, the failure of the one element is repaired within the final pre-set operation time Xend. From FIG. 5B, it is apparent that the shorter the final operation time Xend is, the higher advantage the redundant system enjoys.

An example of the advantage of the double redundant system is as follows: Providing that a failure rate $\lambda$ per hour of one of the two redundant elements is $1.0\times 10^{-6}$ (1/h), used hours per year of the vehicle is 1,000 (h/y), and durable years of the automotive vehicle is 15 (y) (i.e., a life hours Y of the vehicle is 15,000 (h)), a failure rate A of the double redundant system, i.e., a probability that the double redundant system may loose its function is represented by the following expression:

$$\Lambda\approx 2\cdot\lambda^2\cdot Y=2\times 10^{-6\times 2}\times 1.5\times 10^4=3\times 10^{-8}$$

In contrast, in the illustrated embodiment, if the failure of one of the two redundant elements is repaired within 100 hours after the occurrence of the failure, the failure rate A of the double redundant system is represented by the following expression:

$$\Lambda\approx 2\times 10^{-6\times 2}\times 10^2=2\times 10^{-10}$$

From the comparison of the above two failure rates with each other, it is apparent that the double redundant system according to the present invention can enjoy the significantly low failure rate.

The foregoing description relates to the double or second-order redundant system. However, a failure rate of a multiple (i.e., N-th-order) redundant system at an arbitrary time t, i.e., a probability $F_{N(t)}$ that all the N redundant elements of the N-th-order redundant system may fail and accordingly the redundant system as a whole may loose its function can be determined in a similar manner and can be represented by the following expression:

$$\Lambda_{N(t)}=N\cdot\lambda_1\cdot\lambda_2\cdot\lambda_3\cdot\ldots\lambda_N\cdot t^{(N-1)}$$

In addition, in the case where, after a predetermined number of redundant elements out of the N redundant elements of the N-th-order redundant system fail, all the failures of the redundant system (not only the respective failures of the predetermined number of identical elements but also a failure or respective failures of one or more additional redundant elements after the failures of the predetermined number of elements) are repaired within the time duration X after those failures, the failure rate of the redundant system, i.e., the probability that the redundant system as a whole may loose its function is represented by the following expression:

$$\Lambda_{N(t)} = N \cdot \lambda_1 \cdot \lambda_2 \cdot \lambda_3 \cdot \ldots \lambda_N \cdot X^{(N-1)}$$

This failure rate does not depend on time t, and accordingly it can apply to the last time point of the service life of the vehicle.

Providing that the service life of the vehicle is Y hours, an unreliability $F_{N(Y)}$ of the redundant system at the last time point of the service life is represented by the following expression:

$$F_N(Y) \approx N \cdot \lambda_1 \cdot \lambda_2 \cdot \lambda_3 \cdot \ldots \lambda_N \cdot X^{(N-1)} \cdot Y$$

Thus, if the time X is made sufficiently shorter than the time Y, then the reliability $R_{(t)}$ of the redundant system can be increased though the order or degree N of redundancy of the redundant system may not be increased.

Figure 6:
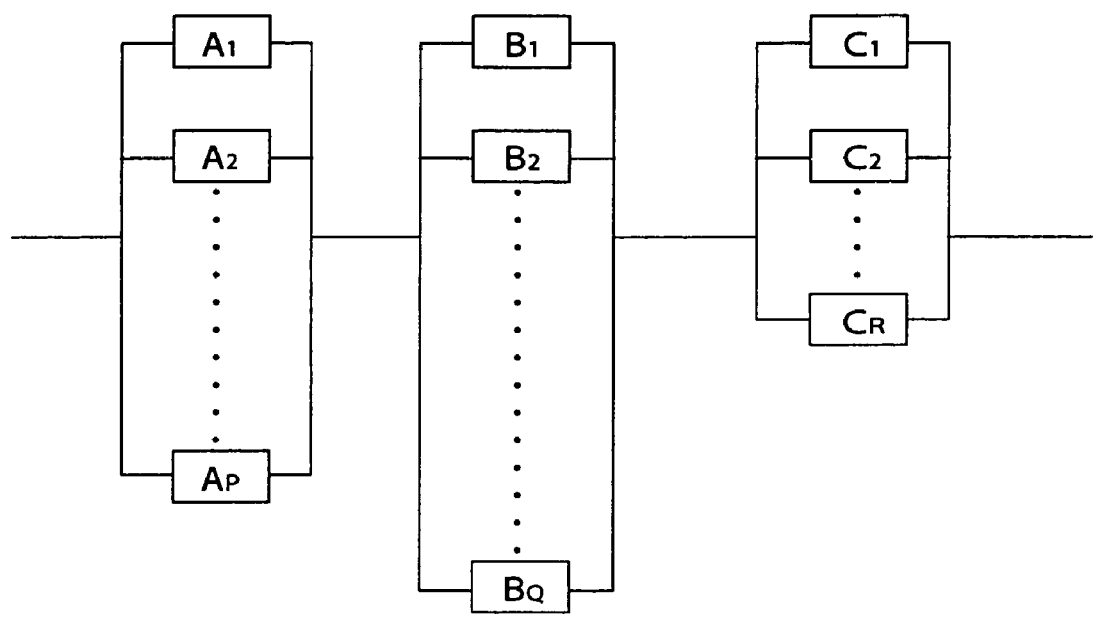
FIG. 6 is a diagrammatic view of a redundant system as another embodiment of the present invention.

The present invention is applicable to not only the above-described simple N-th-order redundant system but also a complex redundant system, as shown in FIG. 6, in which a plurality of N-th order redundant systems, such as a combination of P-th-order, Q-th-order, and R-th-order redundant systems, are connected in series to each other. The number N is an arbitrary natural number not smaller than two. Depending on the arrangement of the N-th order redundant systems, the pre-selected failure and the pre-set time according to the mode (1) recited in SUMMARY OF THE INVENTION, and the first and second pre-selected failures and the pre-set time according to the mode (19) can be appropriately selected and set. In the embodiment shown in FIG. 6, each of redundant elements of a first redundant system, located on an upstream side of a second redundant system, is connected to each of redundant elements of the second redundant system, independent of the other redundant elements of the same. For example, each of redundant elements $A_1, A_2, \ldots, A_P$ of a first redundant system, located on an upstream side of a second redundant system, is connected to each of redundant elements $B_1, B_2, \ldots, B_Q$ of the second redundant system, independent of the other redundant elements of the same, so that an output from each of the redundant elements of the upstream-side redundant system is inputted, in parallel, to each of the redundant elements of the downstream-side redundant system.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. An automotive vehicle having a pre-selected function, the vehicle comprising:
   at least one controller which controls an object and includes a plurality of redundant elements which are redundant with each other;
   a memory which stores a pre-set time which assures that an occurrence probability is smaller than a target probability, the occurrence probability being a probability that, in an event that at least a first pre-selected failure which has occurred to one of the redundant elements has not been solved while another, normal redundant element has operated since an occurrence of the first failure, a second pre-selected failure may occur to the normal redundant element within the pre-set time measured from the occurrence of the first failure; and
   at least one function restraining portion which at least partially restrains the pre-selected function of the vehicle, when at least the first pre-selected failure has not been solved before the normal redundant element has operated, since the occurrence of the first failure, more than the pre-set time stored by the memory.

2. The automotive vehicle according to claim 1, comprising a plurality of said function restraining portions which comprise a plurality of redundant function restraining portions which are redundant with each other.

3. The automotive vehicle according to claim 1, further comprising:
   at least one failure detecting portion which detects the occurrence of the first pre-selected failure to said one of the redundant elements;
   at least one time measuring portion which measures a time which has elapsed since the detection of the occurrence of the first failure by the failure detecting portion, in a state in which the normal redundant element operates; and
   at least one failure-solution detecting portion which detects a solution of the first failure,
   wherein said at least one function restraining portion at least partially restrains the pre-selected function of the vehicle, when the time measured by the time measuring portion exceeds the pre-set time before the failure-solution detecting portion detects the solution of the first failure, and wherein when the failure-solution detecting portion detects the solution of the first failure before the measured time exceeds the pre-set time, the failure-solution detecting portion stops detecting the solution of the first failure and said at least one function restraining portion does not restrain the pre-selected function of the vehicle.

4. The automotive vehicle according to claim 1, further comprising at least one repair advising portion which advises a driver of the vehicle to have the vehicle repaired to solve at least the first failure, in at least a time period between the occurrence of the first failure to said one redundant element and the restraining of the pre-selected function of the vehicle by the function restraining portion.

5. The automotive vehicle according to claim 4, comprising a plurality of said repair advising portions which comprise a plurality of redundant repair advising portions which are redundant with each other.

6. The automotive vehicle according to claim 1, wherein said at least one function restraining portion comprises at least one running-function restraining portion which restrains a running function of the vehicle.

7. The automotive vehicle according to claim 3, wherein the time measured by the time measuring portion is reset to zero at least one of (a) a first time when an assembling of the automotive vehicle is finished, and (b) a second time when a repairing of the first failure of said one redundant element is finished.

8. The automotive vehicle according to claim 7, wherein the time measured by the time measuring portion is not reset even after a main switch, e.g., an ignition switch, of the automotive vehicle is turned off.

9. The automotive vehicle according to claim 1, wherein the plurality of redundant elements of said at least one controller operate for controlling a common parameter of the object.

10. The automotive vehicle according to claim 9, wherein the common parameter of the object comprises an angle of at least one steered wheel of the automotive vehicle.

11. The automotive vehicle according to claim 1, further comprising a judging portion which judges whether at least the first failure has not been solved before the normal redundant element has operated, since the occurrence of the first failure, more than the pre-set time stored by the memory, wherein when the judging portion judges that at least the first failure has been solved before, the function restraining portion does not restrain the function of the vehicle and, when the judging portion judges that at least the first failure has not been solved before, the function restraining portion at least partially restrains the function of the vehicle.

12. The automotive vehicle according to claim 11, wherein the judging portion iteratively judges, in a state in which the normal redundant element operates, whether at least the first failure has been solved.

13. The automotive vehicle according to claim 1, wherein the memory stores a control program including the pre-set time.

14. The automotive vehicle according to claim 1, wherein the pre-set time stored by the memory is obtained based on (a) the target probability and (b) respective failure rates of the redundant elements.

15. The automotive vehicle according to claim 1, wherein said another normal redundant element is a last, normal redundant element of the plurality of redundant elements.

* * * * *